(12) United States Patent
Marino (10) Patent No.: US 9,128,002 B2
(45) Date of Patent: Sep. 8, 2015

(54) SYSTEM AND METHOD FOR DETECTING LEAKS IN A FLUID FILLED VESSEL

(71) Applicant: Mark D. Marino, Lake Worth, FL (US)

(72) Inventor: Mark D. Marino, Lake Worth, FL (US)

(*) Notice: Subject to any disclaimer, the term of this patent is extended or adjusted under 35 U.S.C. 154(b) by 186 days.

(21) Appl. No.: 13/838,618

(22) Filed: Mar. 15, 2013

(65) Prior Publication Data

US 2014/0260548 A1 Sep. 18, 2014

(51) Int. Cl.
| G01M 3/22 | (2006.01) |
| G01M 3/32 | (2006.01) |
| G01M 3/26 | (2006.01) |
| G01M 3/04 | (2006.01) |
| G01M 3/10 | (2006.01) |

(52) U.S. Cl.
CPC ............ G01M 3/3254 (2013.01); G01M 3/226 (2013.01); *G01M 3/04* (2013.01); *G01M 3/10* (2013.01); *G01M 3/26* (2013.01)

(58) Field of Classification Search
CPC ........... G01M 3/04; G01M 3/26; G01M 3/10; G01M 3/20; G01M 3/226
See application file for complete search history.

(56) References Cited

U.S. PATENT DOCUMENTS

| 608,207 | A | * | 8/1898 | Merritt ........................... 285/191 |
| 1,528,081 | A | * | 3/1925 | Schermerhorn et al. .. 134/166 C |
| 1,760,704 | A | * | 5/1930 | Lindstrom ................ 134/166 C |
| 2,028,640 | A | | 1/1936 | Zaiger |
| 2,660,053 | A | * | 11/1953 | Buehner ............................ 73/40 |
| 2,678,666 | A | | 5/1954 | Theis et al. |
| 2,694,924 | A | * | 11/1954 | Matlock et al. .................... 73/37 |
| 3,043,129 | A | * | 7/1962 | King ................................. 73/40 |
| 3,407,337 | A | * | 10/1968 | Benham ........................ 361/49 |
| 3,524,342 | A | * | 8/1970 | Hobbs ............................. 73/40 |
| 4,002,055 | A | * | 1/1977 | Kops ............................... 73/40 |
| 4,231,501 | A | * | 11/1980 | Goode .......................... 224/546 |
| 4,566,313 | A | | 1/1986 | Monten |
| 4,841,149 | A | * | 6/1989 | Martin et al. ................. 250/330 |
| 4,979,390 | A | * | 12/1990 | Schupack et al. ................ 73/38 |
| 5,065,690 | A | * | 11/1991 | Bontempo .................... 116/264 |
| 5,261,269 | A | * | 11/1993 | Barker .......................... 73/40.7 |
| 5,372,031 | A | * | 12/1994 | Harmand ......................... 73/40 |
| 5,381,990 | A | | 1/1995 | Belokin et al. |
| 5,559,282 | A | * | 9/1996 | Knight et al. .................... 73/40 |
| 5,640,096 | A | * | 6/1997 | Alm ............................. 324/559 |
| 5,711,501 | A | | 1/1998 | Belokin et al. |
| 5,734,096 | A | * | 3/1998 | McGuigan et al. ............ 73/49.2 |
| 6,185,755 | B1 | * | 2/2001 | Shepherd et al. ............ 4/255.06 |
| 6,289,722 | B1 | * | 9/2001 | Lycan et al. .................... 73/49.2 |
| 6,314,795 | B1 | | 11/2001 | Ingham |
| 6,367,403 | B1 | * | 4/2002 | Carter .......................... 114/343 |
| 6,463,791 | B1 | * | 10/2002 | Berube et al. ................. 73/49.8 |
| 6,637,258 | B1 | * | 10/2003 | Foreman ...................... 73/40.7 |
| 6,736,278 | B2 | * | 5/2004 | Chang ........................ 211/90.01 |

(Continued)

OTHER PUBLICATIONS

Website from PhiltechPro dated 2015, showing "Kit Offbase Particulier" (4 pages).

*Primary Examiner* — David A Rogers
(74) *Attorney, Agent, or Firm* — Greenberg Traurig, LLP (57) ABSTRACT

A leak detecting device for water filled vessel such as a swimming pool. An annular resilient seal having a central opening contacts the surface of the vessel under water and creates a seal between the resilient seal and the vessel. A rigid housing open in its interior is coupled to the resilient seal and has an opening for an inlet to deliver fluid into the interior of the housing, or couple a flow meter thereto to measure the fluid flow, or deliver a dye into the housing and through the central opening of the resilient seal.

9 Claims, 10 Drawing Sheets

(56) References Cited

U.S. PATENT DOCUMENTS

| | | |
|---|---|---|
| 6,823,719 B2 * | 11/2004 | Poblete .......................... 73/46 |
| 6,942,188 B2 | 9/2005 | Tsay et al. |
| 7,185,529 B2 * | 3/2007 | Ball et al. ................. 73/40.5 R |
| 7,513,274 B1 | 4/2009 | Glenn |
| 2010/0242576 A1 | 9/2010 | Denne et al. |
| 2011/0245682 A1 * | 10/2011 | Robinson et al. ............ 600/473 |
| 2012/0124733 A1 * | 5/2012 | Roberts .......................... 4/496 |

\* cited by examiner

SYSTEM AND METHOD FOR DETECTING LEAKS IN A FLUID FILLED VESSEL

BACKGROUND

This invention relates to a system and method for leak detection, and, more particularly, to a system and method for detecting leaks in a liquid filled vessel such as a swimming pool.

RELATED ART

The use of leak detecting devices are well known in the art, particularly for use in swimming pools. Pools, whether above ground or underground, do leak. Leaks may occur around pool drains, pool lights, skimmers, suction and discharge lines and other pool surfaces, etc.

There is a need for a simple leak detection system for a swimming pool that is easy to use for a pool attendant or pool owner.

SUMMARY OF INVENTION

It is an object of this invention to provide a leak detecting system and method for detection leaks in water filled vessel, such as a swimming pool.

It is a further object of this invention to provide such a system that can detect leaks at drains, lights, skimmers, suction and discharge lines, etc.

These and other objects are preferably accomplished by providing a resilient seal adapted to contact the surface of the vessel underwater where a leak is suspected or may be present. A rigid housing is coupled to the seal and has a fitting accessible from the exterior communicating with the interior of the housing and a central aperture of the seal for delivering a fluid such as a dye into the interior of the housing or coupling a flow meter thereto to detect the flow of water into or out of the housing. The dye solution is used for leak detection purposes.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DESCRIPTION OF THE PREFERRED EMBODIMENT

Figure 1:
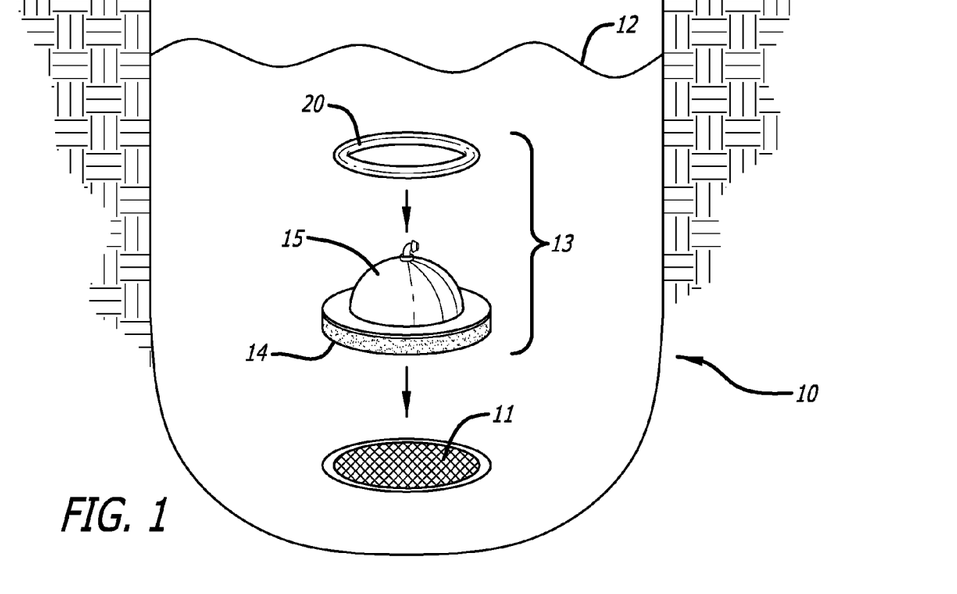
FIG. 1 is a elevational side view of a conventional swimming pool showing the leak detection device prior to installation against the main drain of the pool.

Referring now to the drawings, FIG. 1 is an elevational side view of a conventional swimming pool 10 showing the main drain 11 at the bottom of the pool below water level 12. A leak detection device 13 is shown in exploded view.

Figure 2:
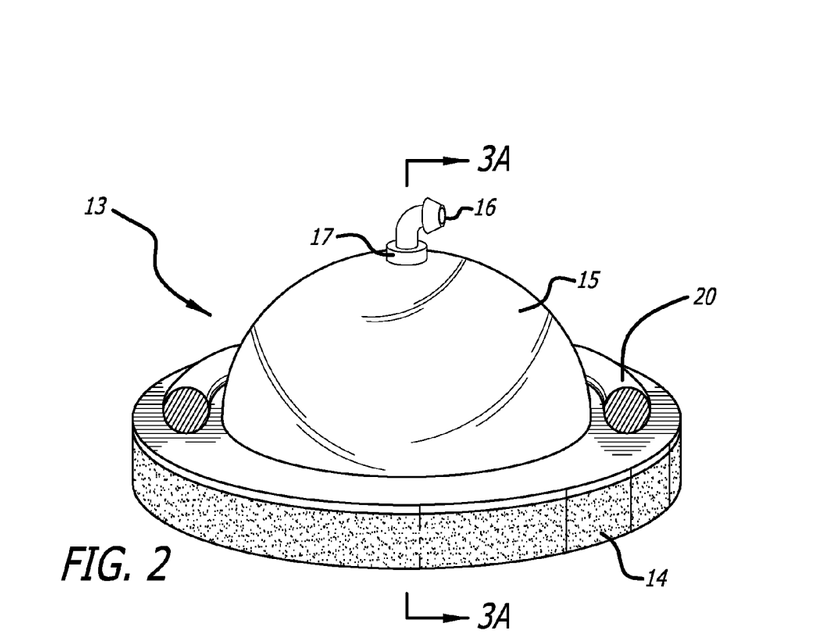
FIG. 2 is an elevational view of a portion of the leak detection device prior to installation.

As seen in FIG. 2, the leak detection device 13 includes a resilient member 14 which is preferably of rubber, such as a soft synthetic rubber, or any other suitable material. It may be solid or inflatable, and preferably annular, such as circular, circular in outer configuration and of a diameter greater than the diameter of drain 11, which drains are generally circular. Thus, as seen in FIG. 3, member 14 has a central hole or opening 14' communicating with the hollow interior 15' of member 15 (see FIG. 3A).

Housing 15 thus is secured to member 14 and may be of a solid material, such as plastic, preferably transparent and dome-shaped. A fluid inlet barb 16 may be provided at top of housing 15 communicating with the interior 15' of housing 15 for injecting fluid into the interior 15' of housing 15. A washer 17, such as a neophrene washer, may be provided where barb 16 enters housing 15 to provide a liquid—tight seal.

Figure 3:
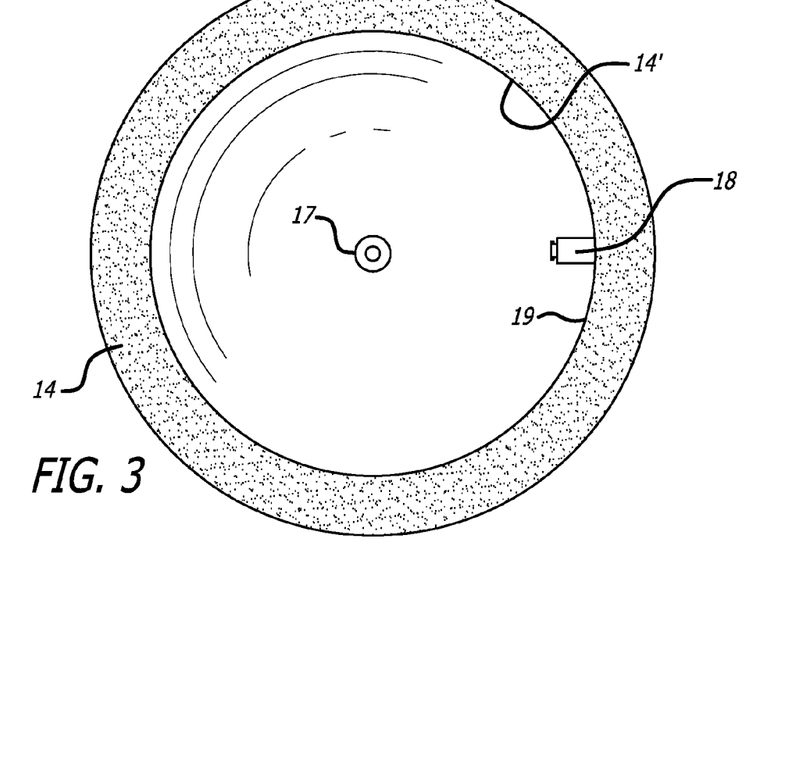
FIG. 3 is a bottom view of a component of the leak detection device of FIG. 2 taken along lines 3-3 of FIG. 2.
Figure 3A:
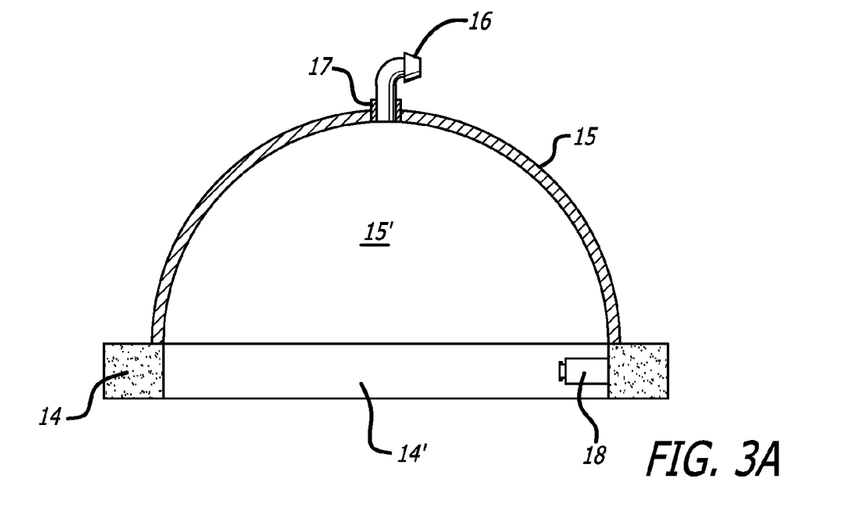
FIG. 3A is a cross-sectional view taken along line 3A-3A of FIG. 2.

As seen in FIG. 3, if member 14 is an inflatable tube, a conventional air inlet 18 may be provided on the bottom wall 19 for inflating tube 14 with air from a suitable exterior source.

Figure 4:
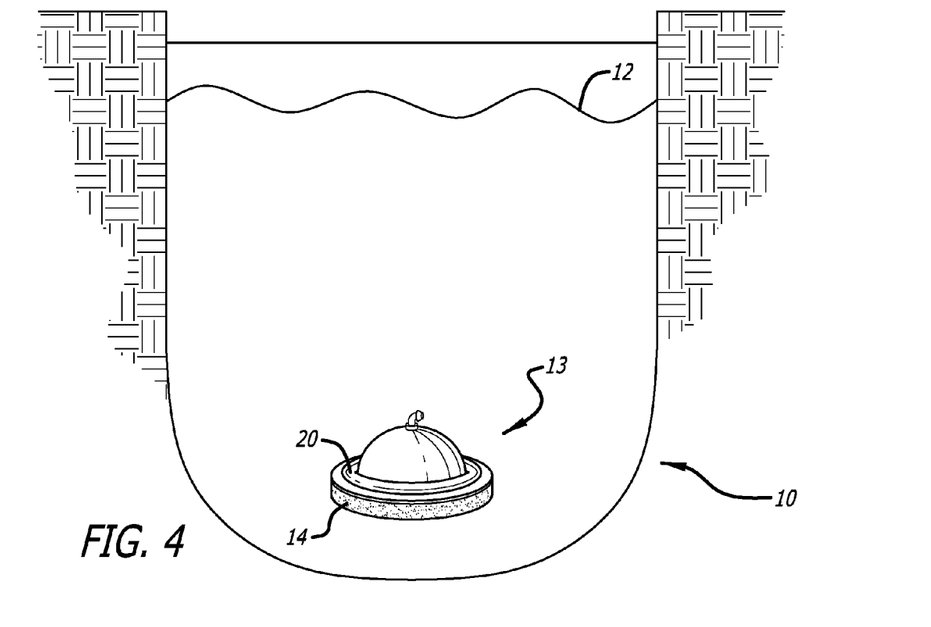
FIG. 4 is a view similar to FIG. 1 showing the leak detection device in position against the pool drainage.

As seen in FIG. 1, a weighted member 20 may be provided to hold housing 15 and member 14 downwardly in a sealing position against drain 11 as seen in FIG. 4. Member 20 is generally a circular ring adapted to encircle housing 15, as seen in FIG. 4, and may be of sufficient weight, such as 10 pounds, to hold device 13 in position against drain 11 creating a seal. Any suitable materials may be used, such as a plastic coated material.

In operation, when the leak detection device 13 is installed against the drain 11 of the pool of FIG. 1, a conventional flow meter may be connected to barb 16 to detect any leaks therethrough. Alternatively, by connecting a suitable hose to barb 16 and running it to the surface of the pool or the like, components in the pool or the like may be tested for leaks while the operator is above water. Thus, any suitable dye solution such as ordinary food coloring and water may be injected therein. If there is a leak, the dye solution will be sucked into the barb 16 that is functioning as an inlet for housing 23. If the pool component is not leaking, the dye will not be sucked in but instead maintain a natural swaying motion underwater.

Alternatively, the pool owner or operator of pool maintenance may dive underwater with a dye solution and inject it through barb inlet 16 using a syringe or the like.

Figure 5:
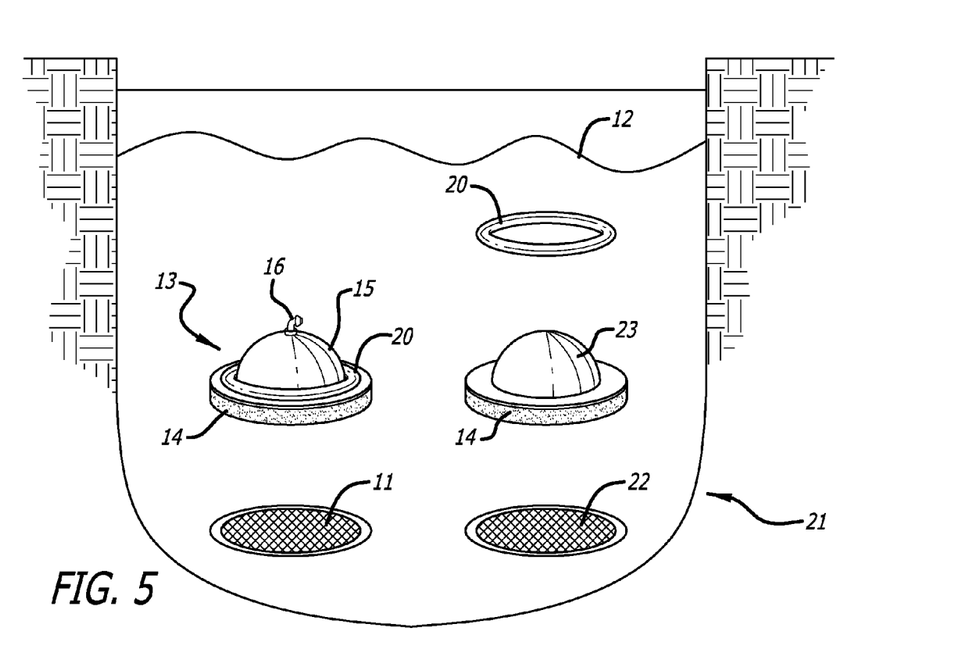
FIG. 5 is an elevational side view of a conventional pool having 2 drains therein with the leak detection device installed over one drain and a second similar device installed over the second drain.
Figure 6:
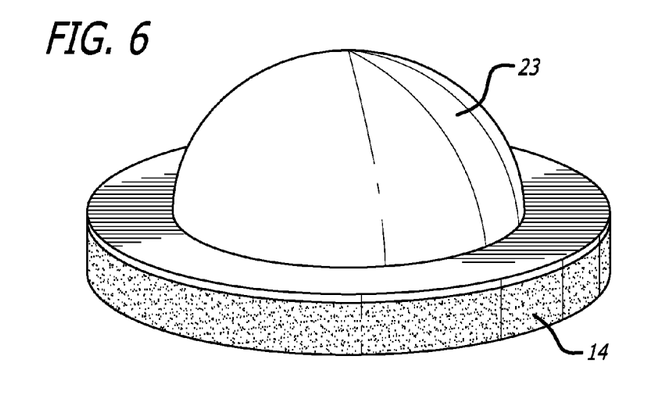
FIG. 6 is an elevational view of a modified portion of the leak detection device of FIG. 2.

As seen in FIG. 5, wherein like numerals refer to like parts of FIG. 1, pool 21 has 2 drains, 11 and 22. Here, housing 23, otherwise similar to housing 15, does not have a barb inlet 16 as seen in FIG. 6. Housing 15 and member 14, weighted by ring member 20, is held against drain 22 while drain 11 is tested for leaks as heretofore discussed, since such drains are generally connected as part of the drain system.

Figure 7:
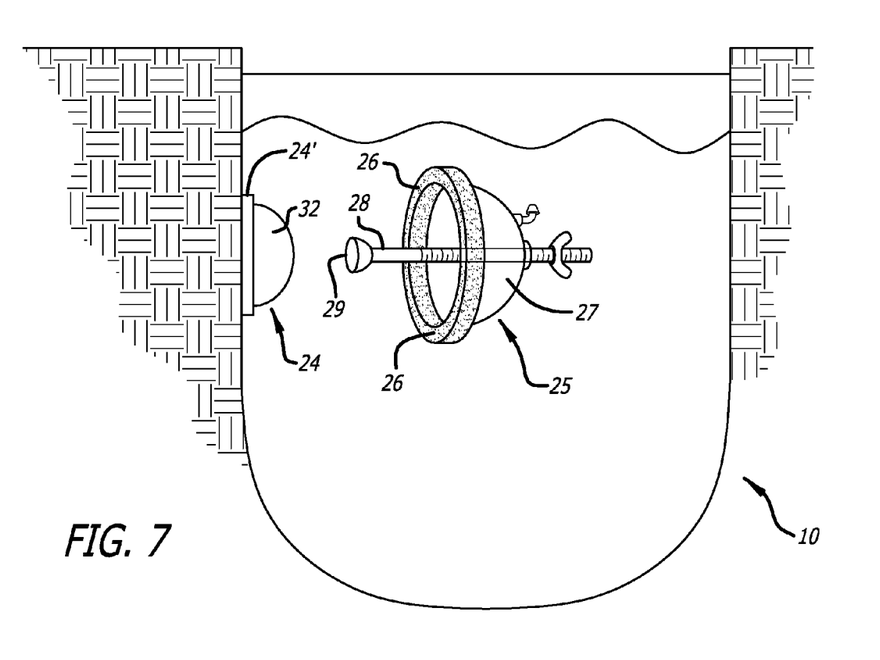
FIG. 7 is a side elevational view of the pool of FIG. 1 showing a conventional pool light installed in the sidewall of the pool and a modified fluid detection device prior to installation.

As seen in FIG. 7, wherein like numerals refer to like parts of FIG. 1, a conventional pool light 24 is shown mounted in the sidewall of pool 10. Here, weighted member 20 is not necessary.

The fluid detection device 25 of FIG. 7 is shown having a resilient member 26, which may be similar to member 14, and may also be inflatable, a housing 27 which may be similar to housing 15, and a barb inlet 16 and washer 17 similar to that shown in the embodiment of FIGS. 1 and 2. However, in this embodiment, a threaded shaft 28 extends through housing 27 and the center of ring 26 and terminates in a conventional suction cup 29 of a resilient material, such as rubber. A resilient washer 30 is provided where shaft 28 enters housing 27, and a wing nut 31, which may be of plastic, may be provided threaded on shaft 28.

Figure 9:
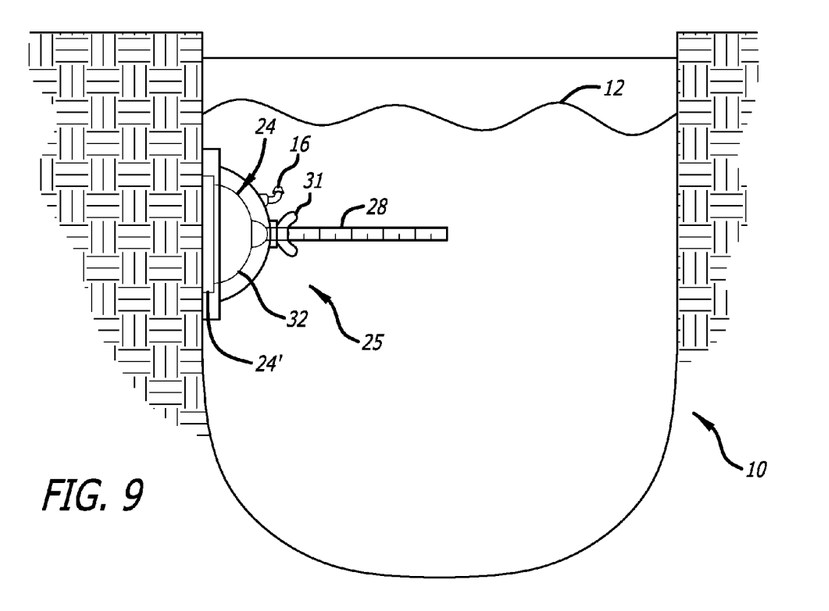
FIG. 9 is a view similar to FIG. 8 showing the fluid detection device sealed to the pool light.

As seen in FIG. 7, shaft 28 extends into a position where cup 29 may engage the outside of dome 32 of light 24. Member 26 is again preferably circular and of a diameter to cover light 24 abutting against the frame 24' holding dome 32 in position (see FIG. 9). Suction cup 29 abuts against dome 32 and wing nut 31 is tightened to force a seal of detection device 25 to light 24 that is created when tightened.

Barb inlet 16 may be used to inject a dye all as previously discussed.

Figure 10:
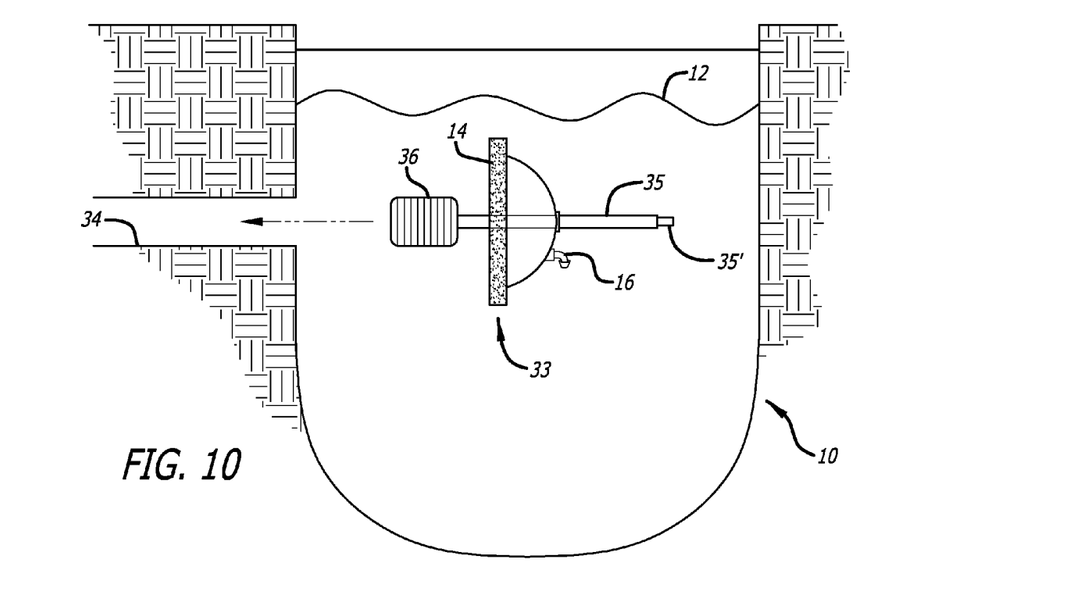
FIG. 10 is a view similar to FIG. 1 showing still another fluid detection device prior to mounting to a suction or discharge pipe of the pool.
Figure 11:
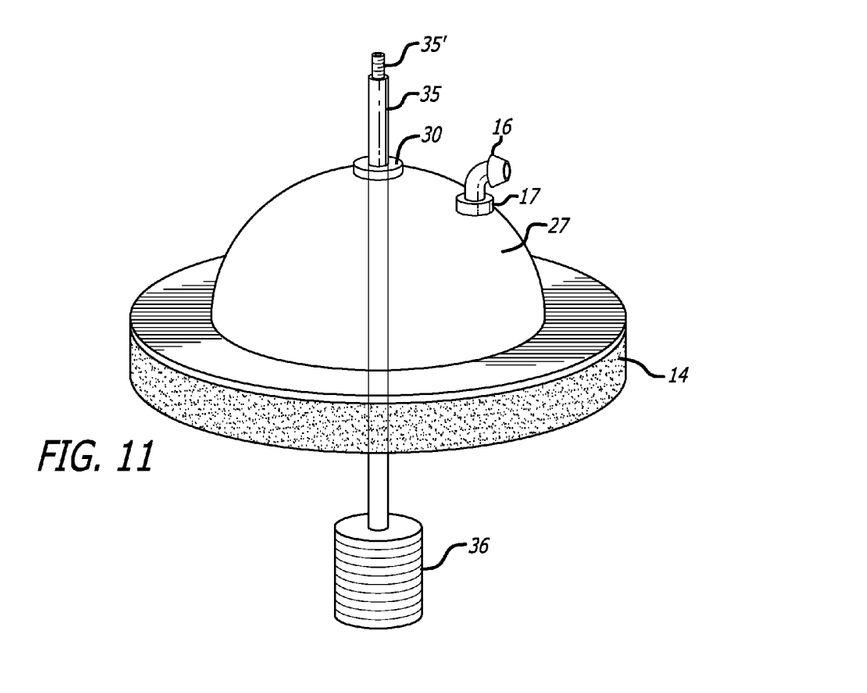
FIG. 11 is an elevational view of the fluid detection device of FIG. 10.
Figure 12:
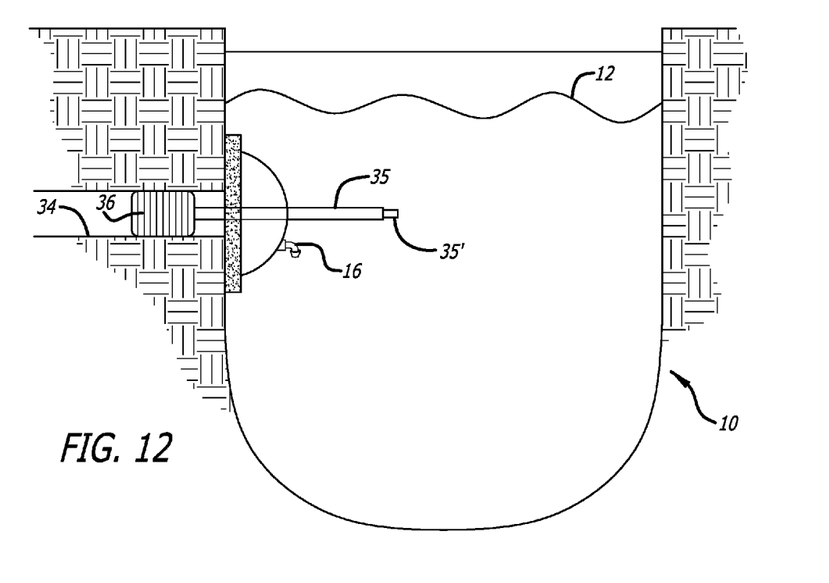
FIG. 12 is a view similar to FIG. 10 illustrating operations of the fluid detection device of FIG. 11.

FIG. 10 shows still another embodiment of the invention. Here, fluid detection device 33, otherwise similar to the fluid detection device components 14, 15 of FIG. 1, shows a conventional suction/discharge pipe 34 of pool 10. As seen in FIG. 11, again member 14 is a resilient member that may be a solid ring or an inflatable ring, and housing 27 is similar to housing 27 of FIG. 8 also having a barbed inlet 16 and washers 17, 30. However, in this embodiment, a hose 35 extends through housing 27, through the center of member 14, and terminates at bottom in an inflatable plug 36. As seen in FIG. 12, plug 36 is inserted into pipe 34 and air may be injected into tube 35 by connecting a suitable source of air to threaded fitting 35' at the top of inflating plug 36 which expands, outwardly against the interior wall of pipe 34, as seen in FIG. 12, to seal off the pipe 34. Again, the leak detection operations discussed above can be carried out through inlet 16.

Figure 13:
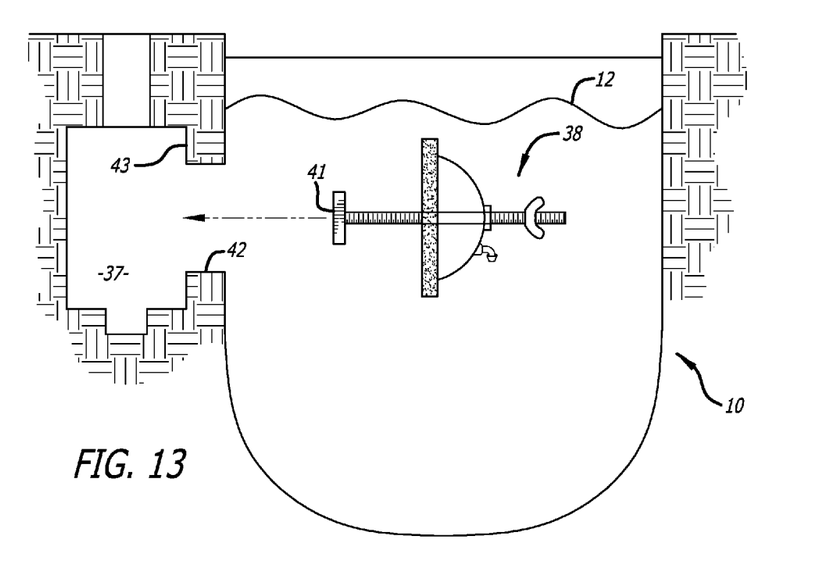
FIG. 13 is a side elevational view of the pool of FIG. 1 showing a conventional skimmer mounted in the side wall and a fluid detection device similar to those discussed in FIGS. 1 to 12.
Figure 14:
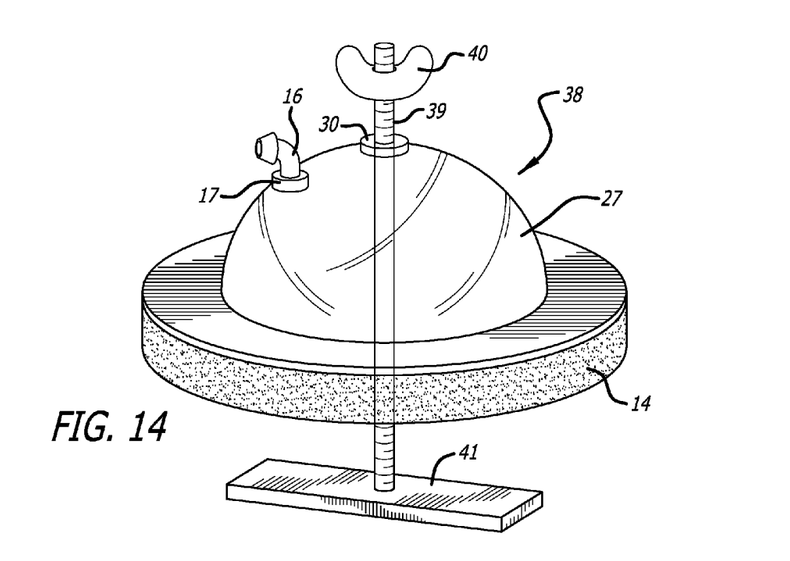
FIG. 14 is an elevational view of the fluid detection device alone of FIG. 13.

FIG. 13 shows a skimmer 37 mounted in the side wall of pool 10 and a fluid detection device 38 shown in detail in FIG. 14.

Figure 8:
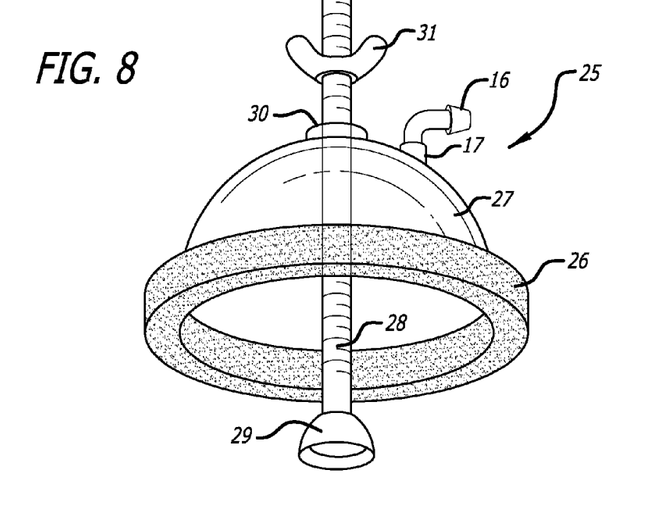
FIG. 8 is an elevational view of the fluid detection device of FIG. 7.

Here, member 14 and housing 27 may be identical to the member 14 and housing 27 of FIG. 8. However, threaded shaft 39, having wing nut 40 threaded thereon, terminates in a brace 41, which may be elongated and generally rectangular, and of any suitable material, such as plastic.

Figure 15:
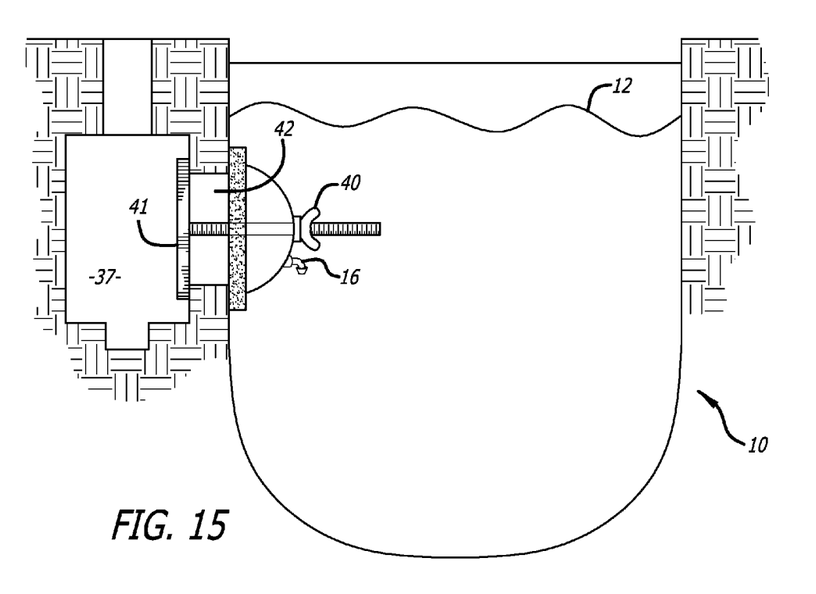
FIG. 15 is a view similar to FIG. 13 showing the fluid detection device in position engaging the pool skimmer.

As seen in FIG. 15, brace 41 is inserted into the opening 42 of skimmer 37, being tilted to facilitate entry, then nut 40 is tightened to seal brace 41 against the inner wall 43 surrounding opening 42 of skimmer 37 sealing off the same as previously, discussed.

Again, inlet 16 may be used to carry out the aftermentioned leak detection.

Figure 16:
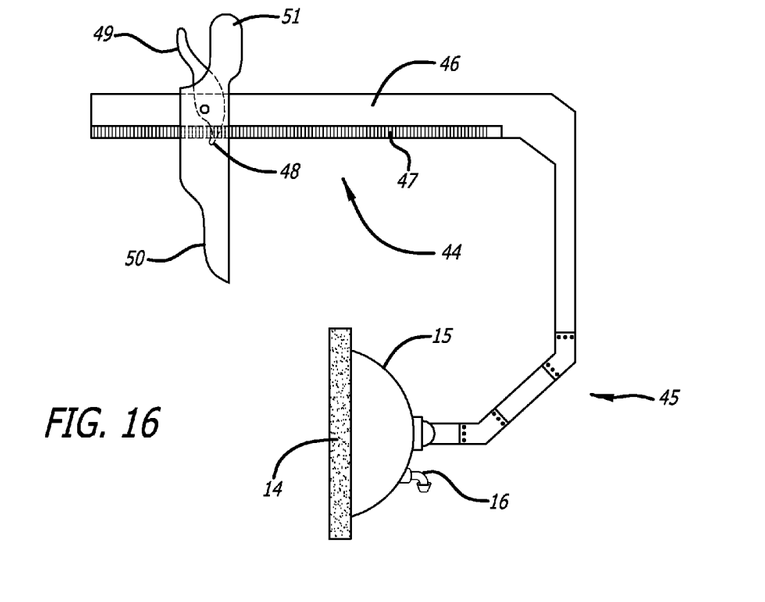
FIG. 16 is a side elevational view of the pool of FIG. 1 similar to FIG. 13 but showing a modified leak detection device in installed position.
Figure 17:
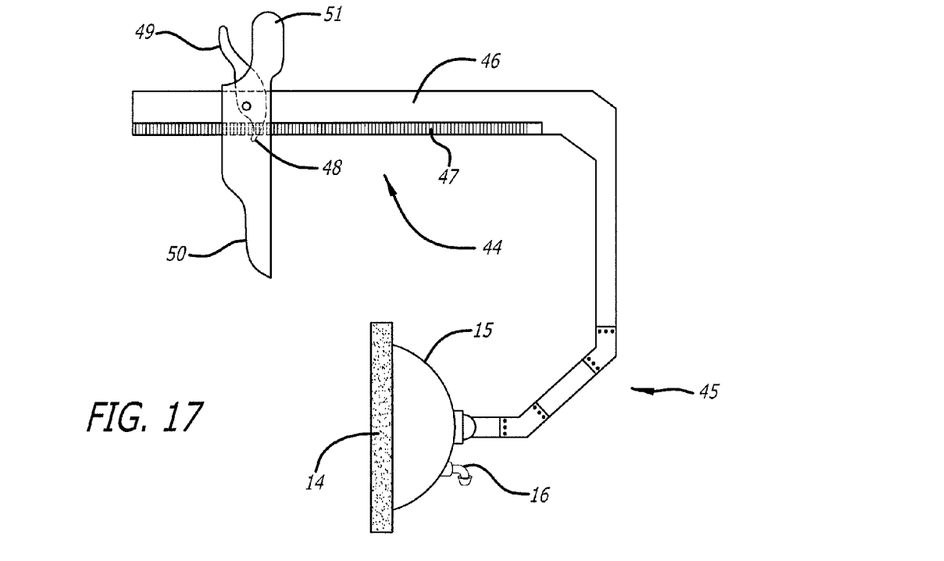
FIG. 17 is an elevational view of the fluid detection device alone of FIG. 16.

Still another modification is shown in FIGS. 16 and 17. The fluid detection device 44 includes a housing 15 and resilient member 14 and inlet 16 similar to that of the embodiment of FIG. 1 (FIG. 17). However, in this embodiment, an adjustable clamp 45 is coupled to housing 15 and has an elongated portion 46 with a plurality of spaced slots or notches 47 engaged by a tooth 48 of a trigger 49 mounted in a clamp portion 50 extending downwardly from extension portion 46. By grasping handle 51 and squeezing trigger 49, into and out of engagement with notches 47, clamp portion 50 can be ratcheted closed along elongated portion 46 similar to a conventional jar lid opener. Thus, as seen in FIG. 16, clamp portion 50 is extending down into the interior of skimmer 37, the skimmer lid having been removed, abutting against inner wall 43, and sealing resilient member 14 and housing 15 against the opening 42 leading into skimmer 37 when trigger 49 is squeezed and clamp portion 50 latches closed.

It can be seen that there are described various embodiments of the invention. Variations thereof may occur to an artisan and the scope of the invention should only be limited by the scope of the appended claims. Any suitable materials or dimensions may be used to carry out the teachings of the invention. Member 14 need only be of a sufficient size to completely surround and seal against the pool component being tested for leaks.

The invention claimed is:

1. A method for detecting leaks of an underwater surface of a swimming pool comprising the steps of inserting a component into a water filled swimming pool, said component having an outer periphery, comprising providing an annular resilient member having a central opening adapted to encircle said component and seal there against; providing a housing of a solid transparent material having a hollow interior on said resilient member with said hollow interior communicating with said central opening, said housing having a peripheral rim engaging said resilient member and sealed thereto in a fluid tight manner;

providing a fluid inlet leading into the interior of said housing remote from said resilient member;

placing said annular resilient member around the outer periphery of said component permitting sealing off said component from said water in said swimming pool; the underwater surface being a defined area with a defined perimeter about which the seal engages, the seal having a central opening; the seal being for effective anchoring in a sealing engagement around the perimeter and in a stationary position relative to the defined underwater surface of the swimming pool, and permitting injecting a dye through said fluid inlet into said housing and through said central opening and against said component;

permitting visually viewing the travel path of the dye in the transparent housing; and permitting determining by the travel path of the dye within the transparent housing the existence of a leak and the location of a leak in the defined area.

2. The method of claim 1 wherein the housing and seal are a device such that when operable is connected above the surface of the water in the swimming pool with only a flexible pipe for delivering dye.

3. A method for detecting leaks of an underwater surface of a swimming pool comprising the steps of inserting a component into a water filled swimming pool, said component having an outer periphery, comprising providing an annular resilient member having a central opening adapted to encircle said component and seal there against; providing a housing of a solid transparent material having a hollow interior on said resilient member with said hollow interior communicating with said central opening, said housing having a peripheral rim engaging said resilient member and sealed thereto in a fluid tight manner;

providing a fluid inlet leading into the interior of said housing remote from said resilient member;

placing said annular resilient member around the outer periphery of said component sealing off said component from said water in said swimming pool; the underwater surface being a defined area with a defined perimeter about which the seal engages, the seal having a central opening; the seal being for effective anchoring in a sealing engagement around the perimeter and in a stationary position relative to the defined underwater surface of the swimming pool,     permitting threading a rod through said member and said resilient seal is a ring,     permitting extending said rod through the center of said ring,     permitting terminating the rod in a suction cup of a resilient material, and the rod and suction cup within the member being visible from outside the member,     permitting injecting a dye through said fluid inlet into said housing and through said central opening and against said component;

permitting visually viewing the travel path of the dye in the transparent housing; and     permitting determining by the travel path of the dye within the transparent housing the existence of a leak and the location of a leak in the defined area.

4. The method of claim 3 wherein said member has an inner wall and permitting threading a nut on said rod outwardly of said member     permitting pulling said suction cup toward said inner wall and tightening the same against said member whereby said cup can engage the dome of a light mounted in said swimming pool with said resilient member encircling said light sealing off the same, and the nut within the member being visible from outside the member.

5. The method of claim 3 wherein the housing and seal are a device such that when operable is connected above the surface of the water in the swimming pool with only a flexible pipe for delivering dye.

6. A method for detecting leaks of an underwater surface of a swimming pool comprising the steps of inserting a component into a water filled swimming pool, said component having an outer periphery, comprising providing an annular resilient member having an opening adapted to encircle said component and seal there against; providing a housing of a solid material having a hollow interior on said resilient member with said hollow interior communicating with said central opening, said housing having a peripheral rim engaging said resilient member and sealed thereto in a fluid tight manner;

providing a fluid inlet leading into the interior of said housing remote from said resilient member;

placing said annular resilient member around the outer periphery of said component sealing off said component from said water in said swimming pool; the underwater surface being a defined area with a defined perimeter about which the seal engages, the seal having an opening; the seal being for effective anchoring in a sealing engagement around the perimeter and in a stationary position relative to the defined underwater surface of the swimming pool,     permitting threading a rod through said member and said resilient seal is a ring,     permitting extending said rod through the center of said ring,     permitting terminating the rod in a suction cup of a resilient material,     permitting injecting a dye through said fluid inlet into said housing and through said opening and against said component; and     permitting visually determining by the travel path of the dye the existence of a leak and the location of a leak in the defined area.

7. The method of claim 6 wherein said member has an inner wall and permitting threading a nut on said rod outwardly of said member     permitting pulling said suction cup toward said inner wall and tightening the same against said member whereby said cup can engage the dome of a light mounted in said swimming pool with said resilient member encircling said light sealing off the same, and the nut within the member being visible from outside the member.

8. The method of claim 6 wherein the housing and seal are a device such that when operable is connected above the surface of the water in the swimming pool with only a flexible pipe for delivering dye.

9. The method of claim 6 wherein said member has an inner wall and permitting threading a nut on said rod outwardly of said member     permitting pulling said suction cup toward said inner wall and tightening the same against said member whereby said cup can engage an area about a drain or skimmer component mounted in said swimming pool with said resilient member encircling said sealing off the same, and the nut within the member being visible from outside the member.

\* \* \* \* \*